(12) United States Patent
Kim et al.

(10) Patent No.: US 7,636,592 B2
(45) Date of Patent: Dec. 22, 2009

(54) MOBILE COMMUNICATION TERMINAL HAVING TWO KEYPADS

(75) Inventors: Hee-Sung Kim, Daegu Metropolitan (KR); Jae-Wan Park, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 583 days.

(21) Appl. No.: 11/475,122

(22) Filed: Jun. 27, 2006

(65) Prior Publication Data

US 2007/0155449 A1    Jul. 5, 2007

(30) Foreign Application Priority Data

Jan. 3, 2006   (KR) .................... 10-2006-0000357

(51) Int. Cl.
*H04M 1/00* (2006.01)

(52) U.S. Cl. ............... 455/575.4; 455/575.1; 455/90.3; 455/566; 455/347; 455/348; 379/433.01; 379/433.04; 379/433.07; 379/433.1; 379/433.11; 379/433.12

(58) Field of Classification Search ............... 455/575.1, 455/575.4, 575.3, 90.3, 566, 347–349; 379/433.01, 379/433.04, 433.07, 433.1, 433.11, 433.12, 379/433.13

See application file for complete search history.

(56) References Cited

U.S. PATENT DOCUMENTS 7,076,058 B2 *   7/2006   Ikeuchi et al. .......... 379/433.12
7,099,708 B2 *   8/2006   Ronkko .................... 455/575.1
7,107,018 B2 *   9/2006   Jellicoe ..................... 455/90.3
7,187,363 B2 *   3/2007   Nguyen et al. ............. 345/168
7,269,450 B2 *   9/2007   Lee et al. ................. 455/575.1
7,283,847 B2 *  10/2007   Kim ........................... 455/566
7,385,150 B1 *   6/2008   Siddiqui et al. ............. 200/5 A
7,469,156 B2 *  12/2008   Kota et al. ................ 455/575.4
2006/0270445 A1* 11/2006   Miramontes ............. 455/550.1

FOREIGN PATENT DOCUMENTS

| CN | 1327336 A | 12/2001 |
|---|---|---|
| JP | 2005-341480 | 12/2005 |
| KR | 2004-0018169 | 3/2004 |
| KR | 2004-0022433 | 11/2004 |

* cited by examiner

*Primary Examiner*—Tuan A Tran
(74) *Attorney, Agent, or Firm*—Roylance, Abrams, Berdo & Goodman, L.L.P.

(57) ABSTRACT

A mobile communication terminal having two keypads is provided. A mobile communication terminal comprises a first body having a left keypad installed at the left side of a front surface, and a second body having a display window installed at its left side and a right key installed at its right side, that is movably assembled with the front surface of the first body in the left or right direction. The mobile communication terminal may be used as a bar type communication terminal when the second body is not moved by sliding. If the left keypad of the first body is exposed by sliding down the second body, the two keypads are located at different sides of the display window, and thereby characters may be easily input with both hands. The two keypads arranged at different sides can each be or can both, be provided with a size large enough for individual character input.

18 Claims, 9 Drawing Sheets

MOBILE COMMUNICATION TERMINAL HAVING TWO KEYPADS

CROSS-REFERENCE TO RELATED APPLICATIONS

This application claims the benefit under 35 U.S.C. § 119 (a) of Korean Patent Application Serial No. 2006-0000357, filed in the Korean Intellectual Property Office on Jan. 3, 2006, the entire contents of which is hereby incorporated by reference.

BACKGROUND OF THE INVENTION

1. Field of the Invention

The present invention relates to a mobile communication terminal. More particularly, the present invention relates to a mobile communication terminal having two keypads, wherein a hidden keypad is covered and uncovered by a sliding method.

2. Description of the Related Art

The communication terminal is generally classified into a wired communication terminal and a wireless communication terminal. A typical wired communication terminal is a telephone mainly used in the office or home. The typical wireless communication terminal includes a PCS, cellular phone or PDA, as well as recently developed PDA phones with PDA functions or messenger phones. A wireless communication terminal generally provides a user with portability and mobility, and is therefore called a mobile communication terminal or portable terminal.

Conventional mobile communication terminals provide users with character information, image information, MP3, and games in addition to simple voice information, which may be identified through a display window of the mobile communication terminal by the users. The mobile communication terminal may be classified into a bar type, which does not have a cover, and flip, folder and sliding types, which have a cover.

The conventional mobile communication terminal includes a display window and a keypad installed under the display window, wherein the keypad is used for input of characters or numbers and a navigation pad is installed between the display window and the keypad for action of special functions.

The related art teaches the use of a keypad to input characters of, for example, a short message to be sent through the mobile communication terminal. Mobile communication terminals with a QWERTY keypad arranged in a keyboard form are commonly used to facilitate the input of characters.

An example of a mobile communication terminal with a conventional QWERTY keypad is illustrated in FIG. 1. Referring to FIG. 1, the mobile communication terminal 100 is a sliding type terminal having a cover 20, and has the structure where a QWERTY keypad 31 is installed on a front surface 12 of the body 10. A display window 33 is installed on a front surface 22 of the cover 20.

However, the QWERTY keypad 31 is installed on an exposed area of the front surface 12 of the body 10, for access when the cover slides upwards. The size of the QWERTY keypad 31 is small since the exposed area of the front surface 12 of the body 10 is small.

It is difficult to input characters through the QWERTY keypad 31 with a thumb and fingers. Therefore, the conventional mobile communication terminal has the drawbacks of low character input speed and frequent input errors.

SUMMARY OF THE INVENTION

An aspect of exemplary embodiments of the present invention is to address at least the above problems and/or disadvantages and to provide at least the advantages described below. Accordingly, an aspect of an exemplary embodiment of the present invention is to provide a mobile communication terminal that may have two keypads each with a size large enough for character input.

Another aspect of an exemplary embodiment of the present invention is to provide a mobile communication terminal that may have two keypads to facilitate character input with both thumbs.

Still another aspect of an exemplary embodiment of the present invention is to provide a mobile communication terminal that may have two keypads to facilitate the input of characters at a high speed.

In order to achieve at least the above objects, an exemplary embodiment of the present invention provides a mobile communication terminal comprising two keypads, a first body, and a second body. The first body comprises a front surface comprising an upper surface and a lower surface formed on left and right sides, respectively, of a stepped surface and comprising a left keypad on the upper surface, and a rear surface formed opposite to the front surface. The second body comprises a rear surface comprising a lower surface and an upper surface on left and right sides, respectively, of a stepped surface and coupled with the front surface of the first body, and a front surface formed opposite to the rear surface and comprising a display window on its left side and a right keypad on its right side, that is movably assembled with the first body along the front surface of the first body. The left key pad is exposed outwardly by moving the second body against the first body to the right, and the left keypad and the right keypad are located on left and right sides, respectively, of the display window.

According to an exemplary embodiment of the present invention, the mobile communication terminal comprising a guiding assembly installed between the first and second bodies where the left keypad can be covered and uncovered by moving the second body along the front surface of the first body is provided.

According to another aspect of an exemplary embodiment of the present invention, the stepped surface of the first body comprises a slope. The left keypad, display window, and right keypad can be located substantially on the same surface by moving the second body to the right against the first body and locating the lower surface of the second body to the lower surface of the first body.

The thicknesses of the upper portions of the first and second bodies may be substantially equal to the sum of the thicknesses of the lower parts of the first and second bodies.

In the mobile communication terminal according to an exemplary embodiment of the present invention, the display window of the second body displays an image in the lengthwise direction when the left keypad is uncovered. The display window of the second body also displays the image in either a widthwise or lengthwise direction when the left keypad is covered.

According to an exemplary embodiment of the present invention, an end surface extended from the lower surface of the second body in the mobile communication terminal may have substantially the same slope as that of the stepped surface of the first body. Substantially the same slopes allow the end surface extended from the lower surface of the second body to be located at the stepped surface of the first body when the left keypad is uncovered. An end surface extended from the lower surface of the first body may have substantially the same slope as that of the stepped surface of the second body so that the stepped surface of the second body is located on the end surface extended from the lower surface of the first body when the left keypad is uncovered.

According to another aspect of an exemplary embodiment of the present invention, the guiding assembly of the mobile communication terminal comprises a pair of rails installed on both edges of the front surface of the first body and guides installed at the rear surface of the second body and movably assembled with the rails individually. The rails may be installed outside the area in which the left keypad of the first body is formed. The guides comprise a first guide and a second guide. The first guide is installed on corners of the rear surface of the second body, and moves along the rails installed at the upper surface and the stepped surface of the first body. The second guide is installed on corners of the stepped surface of the rear surface of the second body, and moves along the rails under the stepped surface of the first body.

Alternatively, the mobile communication terminal of an exemplary embodiment of the present invention comprises a guiding assembly which includes a pair of rails installed along both sides of the first body and guides extended downwards from both sides of the second body and movably assembled with the rails individually. The guides comprise a first guide and a second guide. The first guide is formed on both edges of an end of the second body, and moves along the rails installed on the side surfaces of the first body corresponding to the upper surface and stepped surface of the first body. The second guide is formed on both sides of the stepped surface of the second body, and moves along the rails installed on the side surfaces of the first body corresponding to the lower surface of the first body.

According to an exemplary embodiment of the present invention, the two keypads of the mobile communication terminal have a QWERTY key arrangement in the lengthwise direction.

An exemplary embodiment of the present invention may comprise a mobile communication terminal with a navigation pad further installed between the display window and right keypad of the second body.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
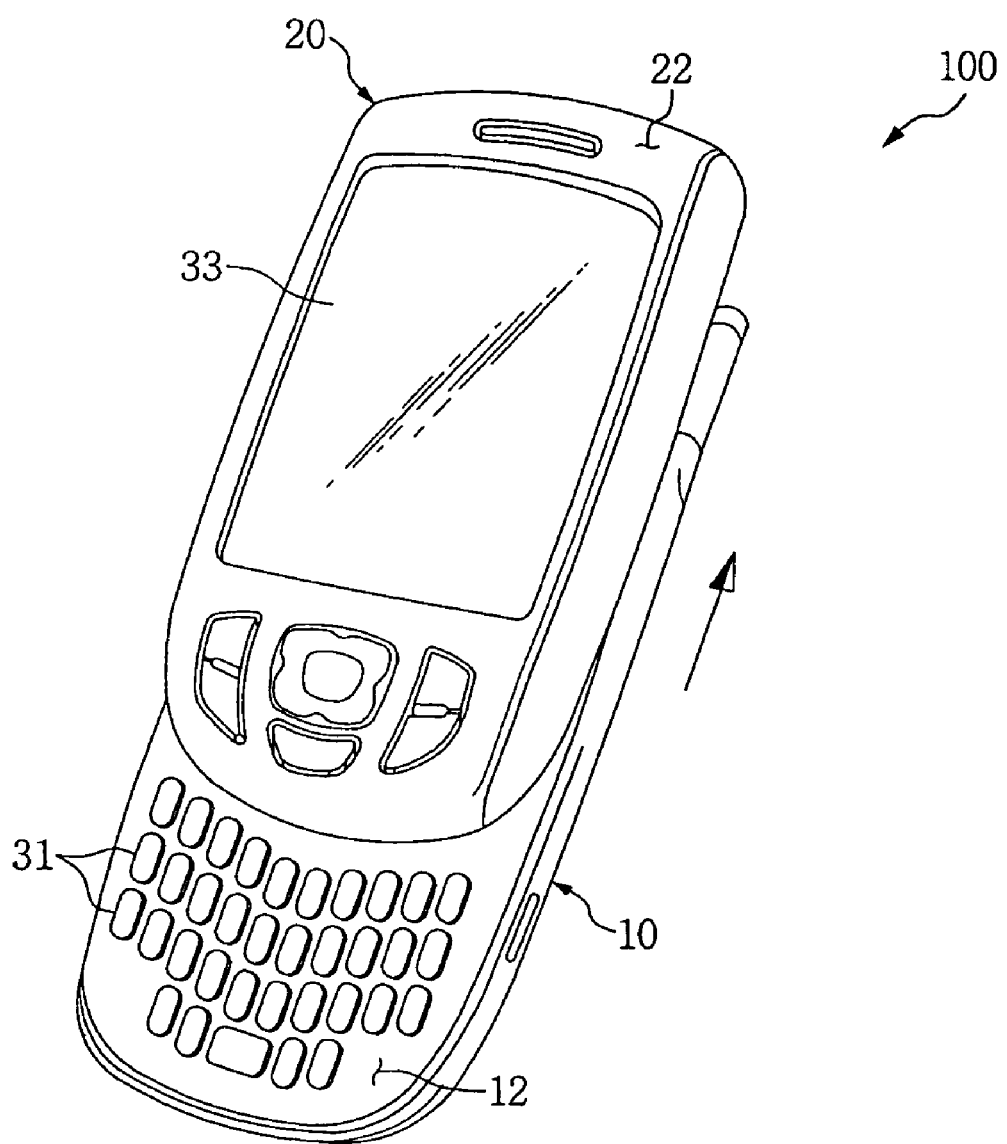
FIG. 1 is a perspective view illustrating a conventional mobile communication terminal having a QWERTY keypad.
Figure 2:
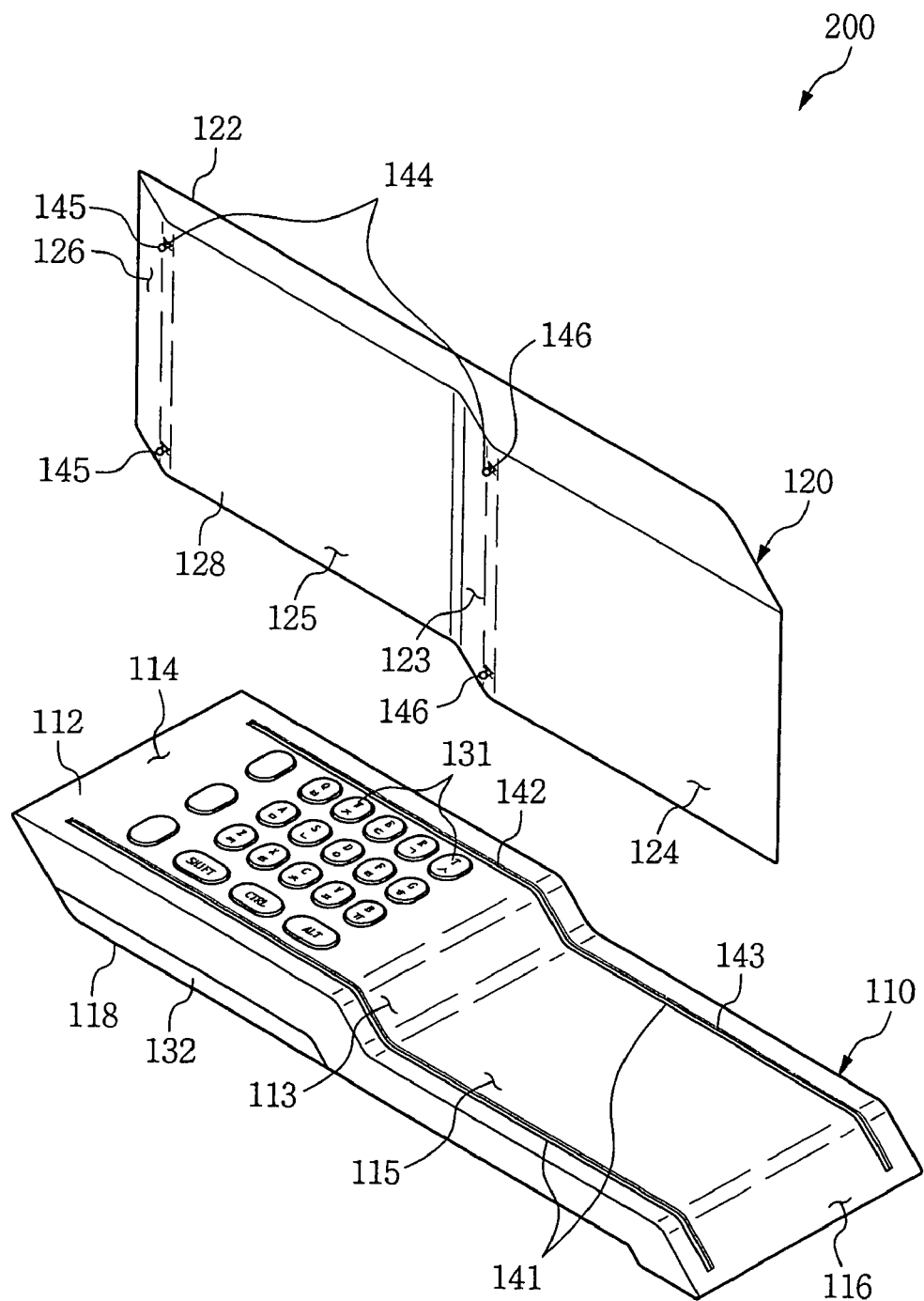
FIG. 2 is an exploded perspective view illustrating a mobile communication terminal having two keypads according to an exemplary embodiment of the present invention.
Figure 3:
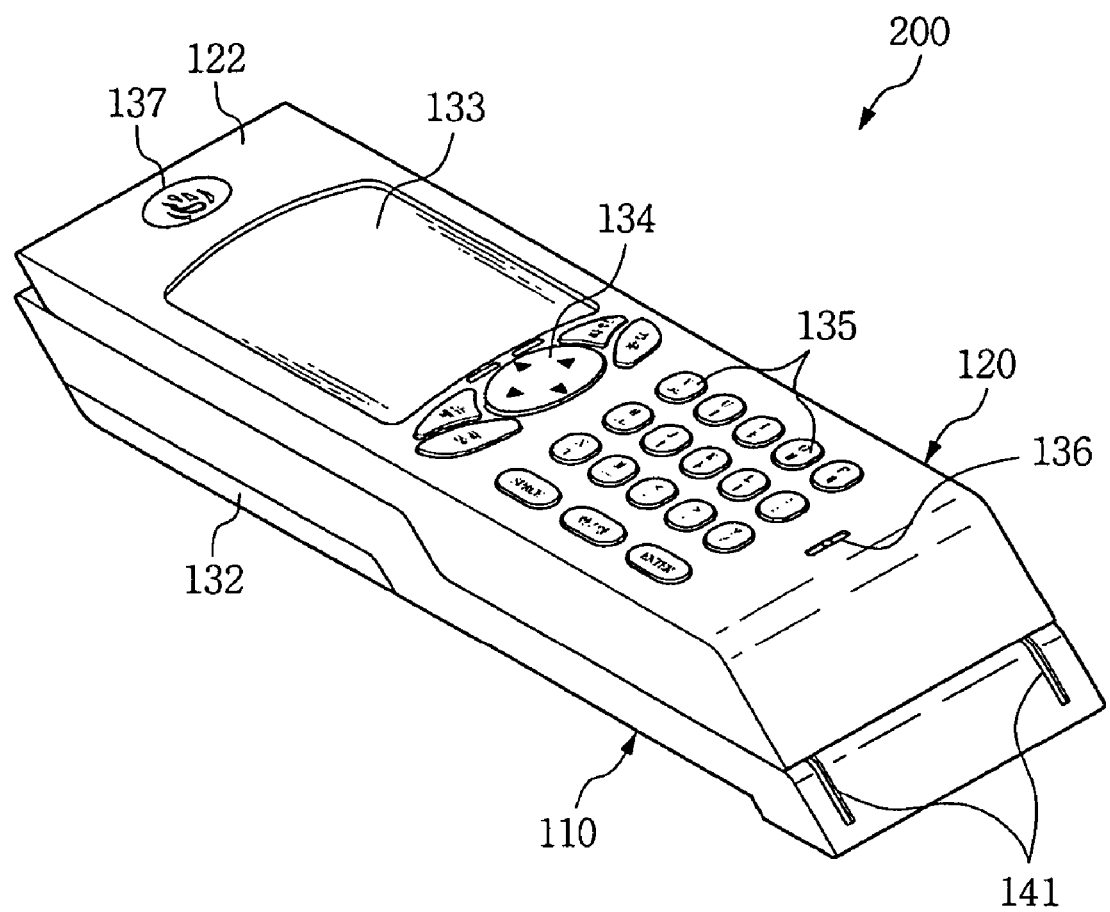
FIG. 3 is a perspective view illustrating an assembled mobile communication terminal of FIG. 2.

FIG. 2 is an exploded perspective view illustrating a mobile communication terminal 200 with two keypads 131 and 135 (as shown in FIG. 3) according to an exemplary embodiment of the present invention.

FIG. 3 is a perspective view showing an assembled state of the mobile communication terminal 200 of FIG. 2.

Referring to FIGS. 2 and 3, the mobile communication terminal 200 according to an exemplary embodiment of the present invention is a mobile communication terminal of a sliding type where a first body 110 and a second body 120 are assembled with the front surface 112 of the first body 110. A left keypad 131 is installed on the left side on the front surface 112 of the first body 110. A display window 133 is installed on the left side on the front surface 122 of the second body 120, and a right keypad 135 is installed on the right side of the display window 133. A guiding assembly comprising rails 141 and guides 144 is installed between the first body 110 and the second body 120 so that the left keypad 131 is uncovered by sliding the second body 120 to the right against the front surface 112 of the first body 110.

In a conventional sliding type mobile communication terminal, a keypad of a first body 110 is exposed from a second body 120 by a slide-up movement of the second body 120 with respect to the first body 110, because the keypad is installed on the right. side on the front surface of the first body 110. In the mobile communication terminal 200 according to an exemplary embodiment of the present invention, the left keypad 131 of the first body 110 is exposed from the second body 120 by a slide-down movement of the second body 120 with respect to the first body 110, because the left keypad 131 is installed on the left side on the front surface 112 of the first body 110.

According to an exemplary embodiment of the present invention, the mobile communication terminal 200 may be used as a bar type communication terminal when the second body 120 is not moved by sliding. If the left keypad 131 of the first body 110 is exposed by sliding down the second body 120, the two keypads 131 and 135 are located on different sides of the display window 133. Therefore, characters may be more easily input with both hands. The two keypads 131 and 135 are arranged on different sides, and may each be provided with a size large enough for individual character input.

The mobile communication terminal 200 of an exemplary embodiment of the present invention is described in detail as follows.

The first body 110 is rectangular in shape, may have a predetermined length, and may have a front surface 112 with a stepped portion in the middle of the first body 110 and a rear surface 118 opposite to the front surface 112. The front surface 112 may have an upper surface 114 and a lower surface 115 formed at the left and right sides respectively of a stepped surface 113. The left keypad 131 is installed at the upper surface 114 of the front surface 112. The stepped surface 113 may be a slope with a predetermined angle, because the upper surface 114 and the lower surface 115 maintain a predetermined separation. Also, a battery pack 132 may be installed at a part of the rear surface 118 beneath the upper surface 114.

The second body 120 is rectangular in shape and may have a predetermined length, a rear surface 128 with a slope facing the front surface 112 of the first body 110, and a front surface 122 opposite to the rear surface 128. The rear surface 128 may have an upper surface 124 and a lower surface 125 formed on the left and right sides respectively of a stepped surface 123. A display window 133 is installed on the left side of the front surface 122, and a right keypad 135 is installed on the right side of the front surface 122. A navigation pad 134 performs special functions and is installed between the display window 133 and the right keypad 135. The display window 133 is installed in an area of the front surface 122 corresponding to the lower surface 125, and the right keypad 135 is installed in an area of the front surface 122 corresponding to the upper surface 124. The navigation pad 134 is installed in an area of the front surface 122 between the display window 133 and the right keypad 135 corresponding to the stepped surface 123.

Before sliding movement of the second body 120, the lower surface 125 of the second body 120 is located on the upper surface 114 of the first body 110, and the upper surface 124 of the second body 120 is located on the lower surface 115 of the first body 110. When the left keypad 131 of the first body 110 is exposed by sliding the second body 120 down, the lower surface 125 of the second body 120 is located at the lower surface 115 of the first body 110, and the upper surface 124 of the second body 120 is moved to the right side of the end surface 116 extended from the lower surface 115 of the first body 110.

The stepped surface 123 of the second body 120 corresponds to the stepped surface 113 of the first body 110 so that the rear surface 128 of the second body 120 faces the front surface 112 of the first body 110 before the sliding movement of the second body 120.

An end surface 126 extended from the lower surface 125 of the second body 120 may have the same slope as that of the stepped surface 113 of the first body 110, and the upper surface 114 of the first body 110 and the front surface 122 of the second body 120 are substantially located at the same surface by sliding the second body 120 down along the stepped surface 113 of the first body 110. Additionally, an end surface 116 extended from the lower surface 115 of the first body 110 may have the same slope as that of the stepped surface 123 of the second body 120. When the end surface 116 has the same slope as the stepped surface, a stable coupling between the first body 110 and the second body 120 is provided by locating the end surface 126 of the second body 120 on the stepped surface 113 of the first body 110 and locating the stepped surface 123 of the second body 120 on the end surface 116 of the first body 110, when the left keypad 131 of the first body 110 is uncovered. In an exemplary implementation, the thickness of the upper surface 114 of the first body 110 and the thickness of the upper surface 124 of the second body 120 are substantially equal to the sum of the thicknesses of the lower surfaces 115 and 125 of the first body 110 and the second body 120, respectively.

In an exemplary implementation, when the left keypad 131 is covered, the display window 133 of the second body 120 displays an image either in a widthwise or lengthwise direction so that the mobile communication terminal can be used as a bar type. In an exemplary implementation, when the left keypad 131 is uncovered, the display window 133 of the second body 120 displays an image in a lengthwise direction.

The left keypad 131 and right keypad 135 have a QWERTY key arrangement in the lengthwise direction. Therefore, characters may be more easily input with both thumbs through both keypads 131 and 135 while holding the left keypad 131 of the first body 110 with the left hand and holding the right keypad 135 of the second body 120 with the right hand, because the keypads 131 and 135 are arranged separately to the left and right respectively, and the display window 133 is located in the middle.

In an exemplary implementation, the guiding assembly includes a pair of rails 141 installed on both edges of the front surface 112 of the first body 110, and guides 144 installed on the rear surface 128 of the second body 120, wherein the guides 144 are movably assembled with the rails 141.

The rails 141 are installed parallel to each other outside the area in which the left keypad 131 is located. One end of the rails 141 is located within the edge of the upper surface 114 of the first body 110, and the other end of the rails 141 is located within the edge of the end surface 116 extended from the lower surface 115 of the first body 110. The rails 141 include a first rail 142 installed on the upper surface 114 and the stepped surface 113 of the first body 110 and a second rail 143 installed on the lower surface 115 and the end surface 116 of the first body 110, wherein the second rail 143 is connected to the first rail 142. The first rail 142 and the second rail 143 are substantially of the same shape.

The guides 144 comprise first guides 145 and second guides 146 installed in a predetermined separation on the rear surface 128 of the second body 120. The first guides 145 are installed on corners of the lower surface 125 of the second body 120. The first guides 145 move along the first rail 142 of the first body 110. The second guides 146 are installed on corners of the stepped surface 123 of the second body 120. The second guides 146 move along the second rail 143 of the first body 110. The first guides 145 are installed on the corners of the lower surface 125 and the second guides 146 are installed on the corners of the stepped surface 123 of the second body 120. This installation provides a stable vertical movement of the second body 120 along the stepped surface 113 and the end surface 116 of the first body 110, when the second body 120 slides against the first body 110. During uncovering, the first guides 145 and the second guides 146 move horizontally along the rail formed on the upper surface 114 and the lower surface 115 of the first body 110. The first guides 145 and the second guides 146 move downwards substantially simultaneously on the corners of the stepped surface 113 and the end surface 116 of the first body 110. The first guides 145 stop at a corner where the stepped surface 113 and the lower surface 115 of the first body 110 intersect with each other. The second guides 146 stop at the other end of the rails 141 formed on the end surface 116 of the first body 110.

In an exemplary implementation, a microphone 136 inputting a sound signal for voice communication is installed on the right side of the right keypad 135 on the second body 120, and an ear piece 137 outputting the sound signal is installed on the left side of the display window 133 on the second body 120. A camera module for taking a picture may also be installed at a suitable location either of the first body 110 or the second body 120. The first body 110 and the second body 120 may be electrically connected through a flexible wiring substrate or a contact point.

According to an exemplary embodiment of the present invention, the steps of uncovering the mobile communication terminal 200 by a sliding method are described with reference to FIG. 3 and FIGS. 4a to 4c as follows.

FIG. 3 illustrates the mobile communication terminal 200 in the state where the second body 120 covers the front surface 112 of the first body 110. In this state, the mobile communication terminal 200 without sliding may be used for voice communication as a bar type.

Figure 4A:
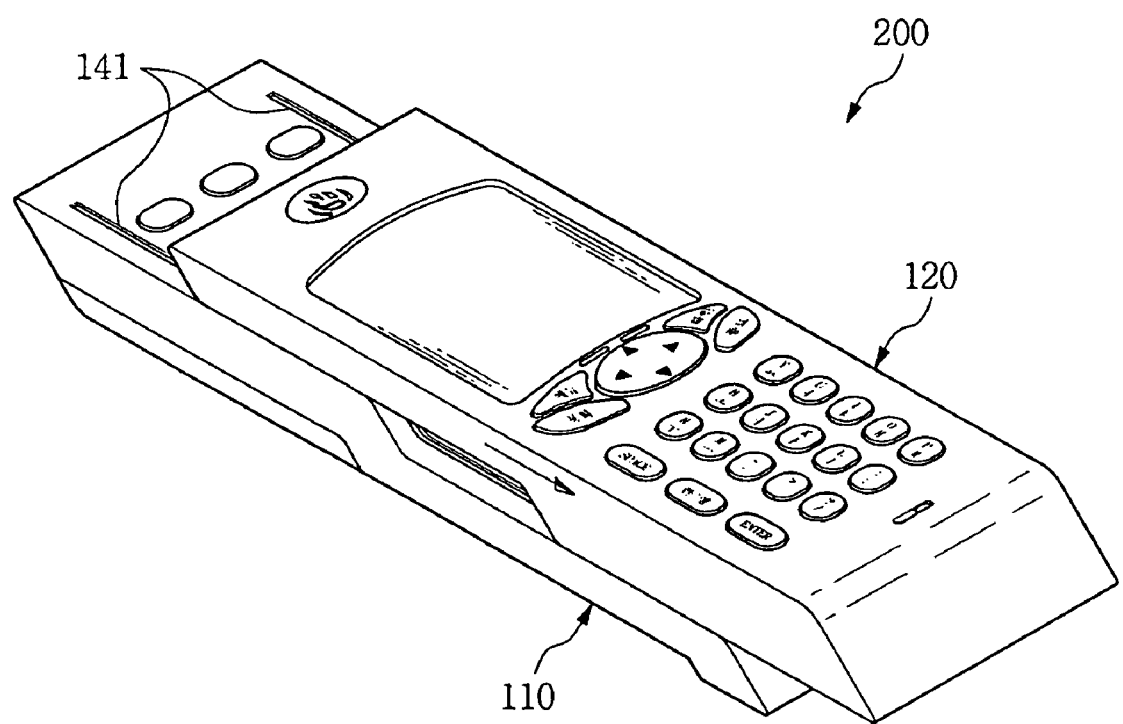
FIGS. 4a to 4c are perspective views illustrating uncovered states of the mobile communication terminal of FIG. 3 with a sliding method according to an exemplary embodiment of the present invention.

As shown in FIG. 4a, if the second body 120 is pushed to the right against the first body 110, the second body 120 horizontally moves to the right along the rails 141 of the first body 110.

Figure 4B:
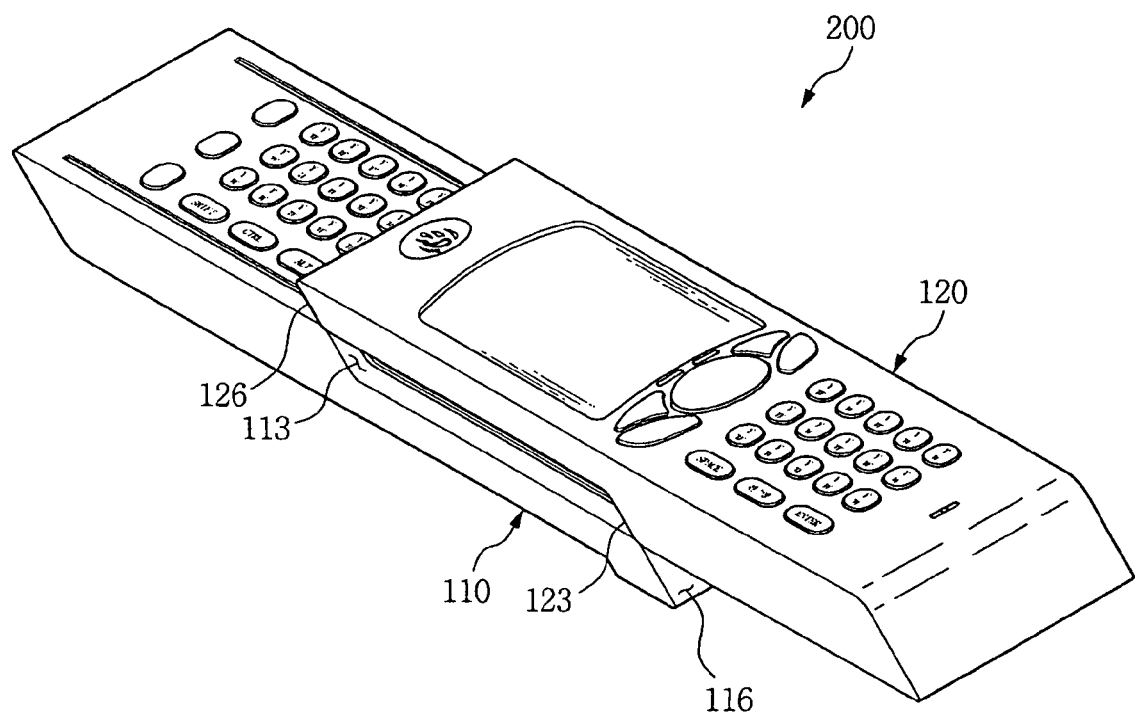

As shown in FIG. 4b, the second body horizontally moves to the right until the end surface 126 of the second body 120 and the corner of the stepped surface 123 are located respectively at the stepped surface 113 of the first body 110 and the corner of the end surface 116.

Figure 4C:
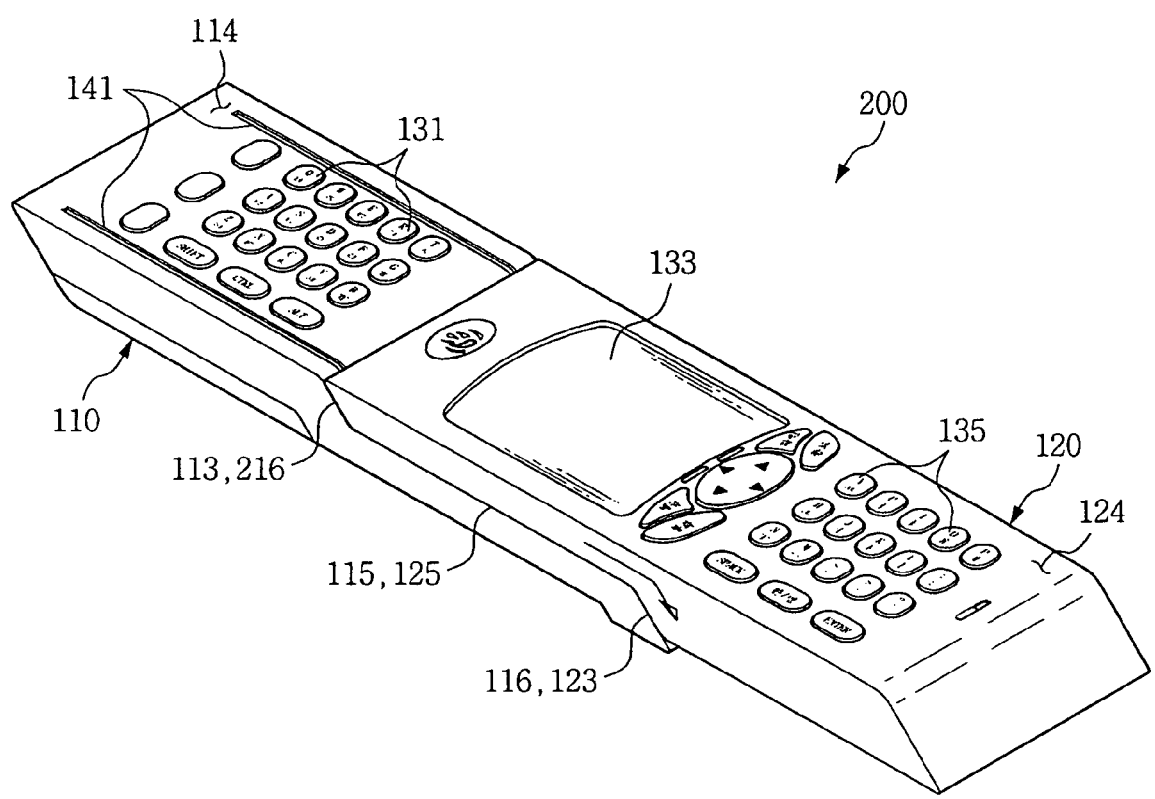

As shown in FIG. 4c, the lower surface 125 of the second body 120 is closely settled at the lower surface 115 of the first body 110 as the second body 120 moves downwards along the rails 141 formed at the stepped surface 113 and the end surface 116 of the first body 110. In this state, the end surface 126 of the second body 120 is closely settled on the stepped surface 113 of the first body 110, and the stepped surface 123 of the second body 120 is closely settled on the end surface 116 of the first body 110. At this moment, the display window 133 displays an image in the lengthwise direction.

Keypads 131 and 135 are located on different sides of the display window 133. The left keypad 131, display window 133, and the right keypad 135 are arranged in sequence and located on the same surface. Additionally, stable character input is provided when the two keypads 131 and 135 are held with both hands, because the thicknesses at the upper surfaces 114 and 124 of the first body 110 and the second body 120 formed with the keypads 131 and 135 respectively are approximately equal.

A detailed explanation for closing the mobile communication terminal 200 is omitted, because the steps described above may be performed in the reverse sequence to facilitate the closing of the mobile communication terminal 200.

Figure 5:
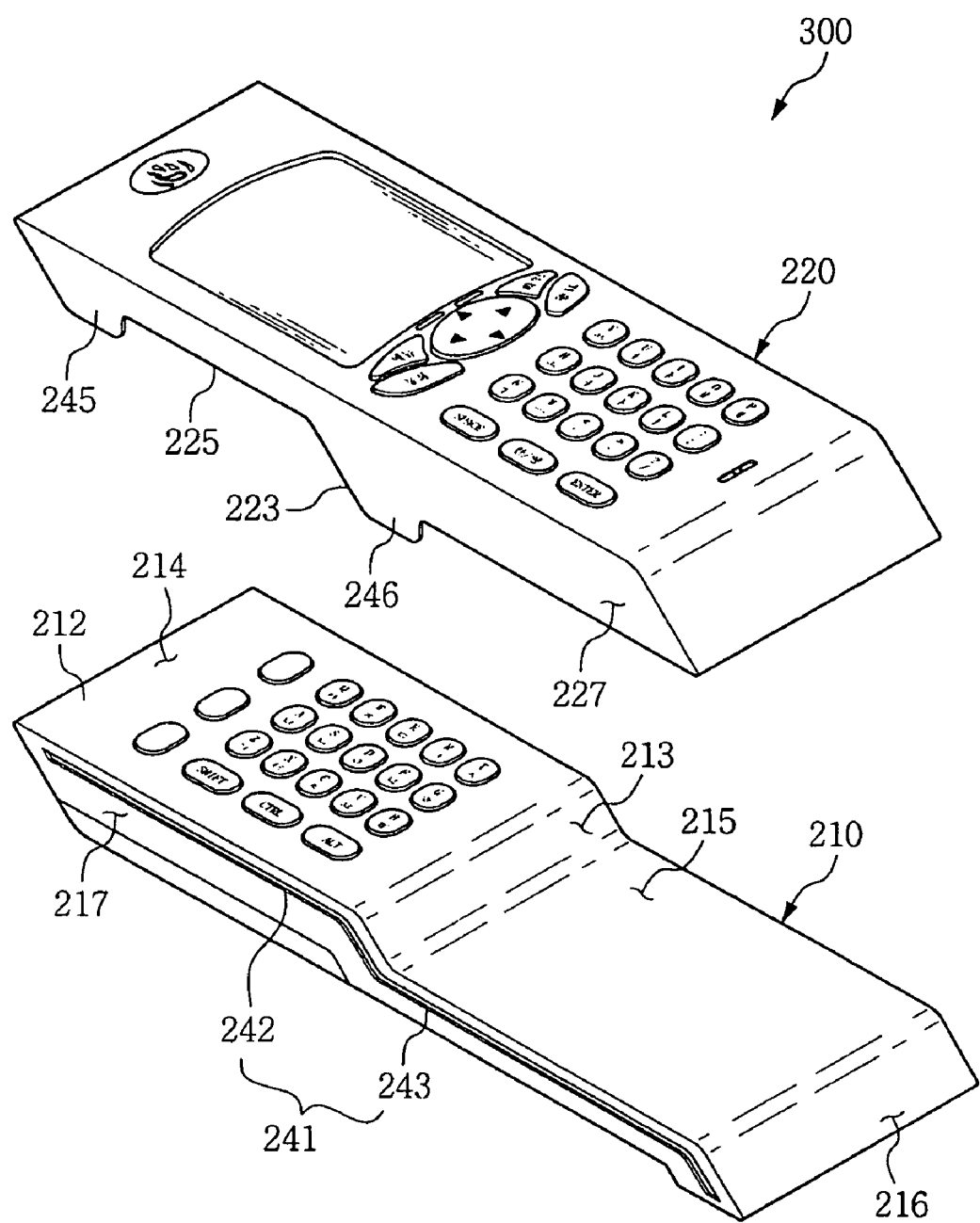
FIG. 5 is an exploded perspective view illustrating a mobile communication terminal with two keypads according to an exemplary embodiment of the present invention.
Figure 6:
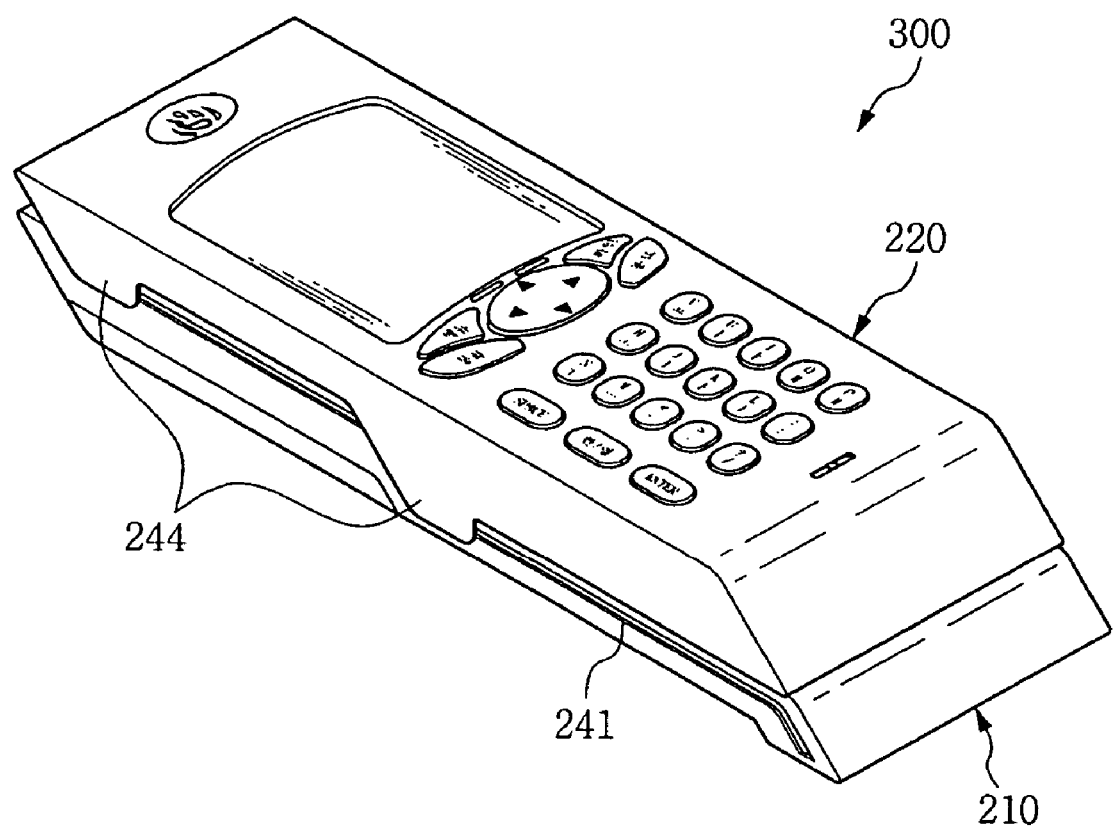
FIG. 6 is a perspective view illustrating an assembled state of the mobile communication terminal of FIG. 5.

Although an example of installing a guiding assembly on the surfaces of a first body and a second body is described in the context of an exemplary embodiment of the present invention, the guiding assembly may be installed on side surfaces 217 and 227 respectively of the first body 210 and the second body 220 as shown in FIGS. 5 and 6.

Referring to FIGS. 5 and 6, a mobile communication terminal 300 according to an exemplary embodiment of the present invention may have the same structure as that of the exemplary embodiment of the present invention described above, except for the installation of a guiding assembly on the side surfaces 217 and 227 respectively of the first body 210 and the second body 220. The following description focuses on the guiding assembly comprising rails 241 and guides 244.

The guiding assembly comprises the rails 241 installed along both side surfaces 217 of the first body 210 and the guides 244 movably assembled with the rails 241 extending downwards from both side surfaces 227 of the second body 220.

The rails 241 are installed along the side surfaces 217 close to the front surface 212 of the first body 210. The rails 241 includes a first rail 242 installed on the side surface 217 corresponding to an upper surface 214 and a stepped surface 213 of the first body 210, and a second rail 243 installed on the side surface 217 corresponding to a lower surface 215 and an end surface 216 of the first body 210, wherein the second rail 243 is connected to the first rail 242. The first rail 242 and the second rail 243 are substantially of the same shape.

The guides 244 include first guides 245 and second guides 246 installed on the side surfaces 227 of the second body 220 in a predetermined separation. The first guides 245 are formed on the ends corresponding to the lower surface 225 of both side surfaces 227 of the second body 220, and move along the first rail 242. The first guides 245 are preferably formed on the side surfaces 227 corresponding to the corners of the lower surface 225 of the second body 220. The second guides 246 are formed on both side surfaces 227 of the stepped surface 223 of the second body 220, and move along the second rail 243. In an exemplary implementation, the second guides 246 can be formed on the side surfaces 227 corresponding to the corners of the stepped surface 223 of the second body 220.

The first guides 245 are installed on the corners of the side surface 227 and the second guides 246 are installed on the corners of the stepped surface 223 of the second body 220 to provide a stable vertical movement of the second body 220 along the stepped surface 213 and the end surface 216 of the first body 210, when the second body 220 slides against the first body 210.

Figure 7:
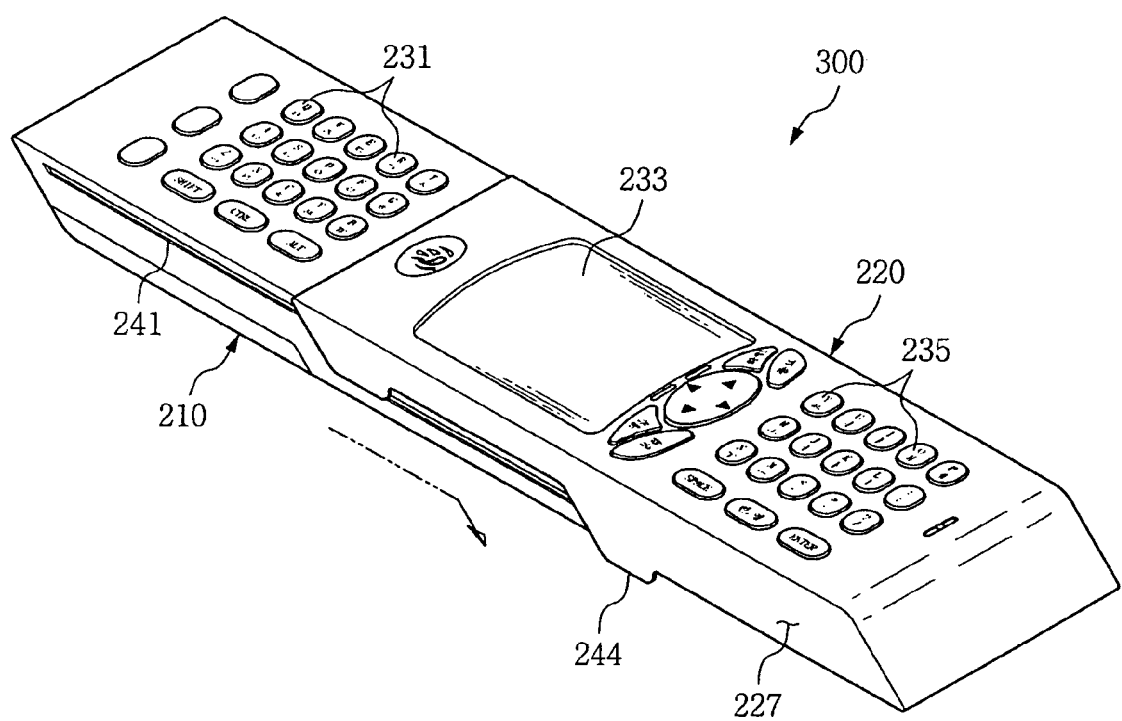
FIG. 7 is a perspective view illustrating an uncovered state of the mobile communication terminal of FIG. 6 with a sliding method.

In the mobile communication terminal 300 of an exemplary embodiment of the present invention, the second body 220 is guided by the rails 241 and guides 244 installed on both side surfaces 217 and 227 respectively of the first body 210 and the second body 220 as shown in FIG. 7. Therefore, when the second body 220 moves to the right against the first body 210, both keypads 231 and 235 and a display window 233 are arranged on substantially the same surface in substantially the same way as in the mobile communication terminal according to an exemplary embodiment of the present invention.

The mobile communication terminal of an exemplary embodiment of the present invention may be used as a bar type communication terminal when the second body is not moved by sliding. When the left keypad of the first body is exposed by sliding down the second body, the two keypads will be located on different sides of the display window. This location of the key pads allows characters to be more easily input with both hands. In an exemplary implementation, the two keypads arranged at different sides are provided with a size large enough for individual character input, even in the case that the keypads are arranged in a QWERTY type.

While the present invention has been shown and described with reference to certain exemplary embodiments thereof, it will be understood by those skilled in the art that various changes in form and details may be made therein without departing from the spirit or scope of the invention as defined by the appended claims and their equivalents.

What is claimed is:

1. A mobile communication terminal comprising:
   a first body comprising a front surface, the front surface comprising an upper surface and a lower surface on the left and right sides respectively of a stepped surface, and a rear surface opposite to the front surface;
   a left keypad configured on the upper surface;
   a second body comprising a rear surface, the rear surface comprising a lower surface and an upper surface on left and right sides respectively of a stepped surface and a front surface formed opposite to the rear surface;
   a display window configured on a left side of the front surface; and
   a right keypad configured on a right side of the front surface;
   wherein the front surface of the first body faces the rear surface of the second body, the second body is movably coupled with the first body, whereby when the left key pad is exposed outwardly by moving the second body rightward with respect to the first body, the left keypad and the right keypad are located on left and right sides respectively of the display window.

2. The mobile communication terminal of claim 1, further comprising a guiding assembly between the first and second bodies whereby the left keypad is covered and uncovered by moving the second body along the front surface of the first body.

3. The mobile communication terminal of claim 2, wherein the stepped surface of the first body comprises a slope.

4. The mobile communication terminal of claim 3, wherein at least two of the left keypad, the display window, and the right keypad are located substantially on the same surface by moving the second body rightward against the first body and locating the lower surface of the second body to the lower surface of the first body.

5. The mobile communication terminal of claim 4, wherein the thicknesses of the upper portions of the first and second bodies are substantially equal to the sum of the thicknesses of the lower parts of the first and second bodies.

6. The mobile communication terminal of claim 5, wherein the display window of the second body displays an image in a lengthwise direction when the left keypad is uncovered, and displays the image in at least one of a widthwise direction and the lengthwise direction when the left keypad is covered.

7. The mobile communication terminal of claim 6, wherein an end surface extended from the lower surface of the second body comprises substantially the same slope as the stepped surface of the first body whereby the end surface extended from the lower surface of the second body is located on the stepped surface of the first body when the left keypad is uncovered.

8. The mobile communication terminal of claim 7, wherein the end surface extended from the lower surface of the first body comprises substantially the same slope as that of the stepped surface of the second body whereby the stepped surface of the second body is located on the end surface extended from the lower surface of the first body when the left keypad is uncovered.

9. The mobile communication terminal of claim 8, wherein the guiding assembly comprises:
    a pair of rails installed on both edges of the front surface of the first body; and
    guides installed on the rear surface of the second body and movably assembled with the rails individually.

10. The mobile communication terminal of claim 9, wherein the rails are installed outside the area comprising the left keypad of the first body.

11. The mobile communication terminal of claim 10, wherein the guides comprise:
    first guides installed on corners of the rear surface of the second body, the first guides being movable along the rails installed on the upper surface and the stepped surface of the first body; and
    second guides installed on corners of the stepped surface of the rear surface of the second body, the second guides being movable along the rails installed under the stepped surface of the first body.

12. The mobile communication terminal of claim 8, wherein the guiding assembly comprises:
    a pair of rails installed along both sides of the first body; and
    guides extended downwards from both sides of the second body and movably assembled with the rails individually.

13. The mobile communication terminal of claim 12, wherein the guides comprise:
    first guides formed on both edges of an end of the second body, the first guides being movable along the rails installed on the surfaces of the first body corresponding to the upper surface and stepped surface of the first body; and
    second guides formed on both sides of the stepped surface of the second body, the second guides being movable along the rails installed on the side surfaces of the first body corresponding to the lower surface of the first body.

14. The mobile communication terminal of claim 1, wherein at least one of the right and left key pads comprises a QWERTY key arrangement in the lengthwise direction.

15. The mobile communication terminal of claim 14, further comprising a navigation pad configured between the display window and the right keypad of the second body.

16. A mobile communication terminal comprising:
    a first body comprising a left keypad installed on the left side of a front surface;
    a second body assembled with the front surface of the first body, the second body being movable in at least one of a left direction and a right direction with respect to the first body;
    a display window configured on the left side of the front surface of the second body;
    a right keypad configured on the right side of the display window, wherein both the left keypad and the right keypad have a QWERTY key arrangement in the lengthwise direction; and
    a guiding assembly interposed between the first body and the second body;
    whereby the left keypad of the first body is uncovered by moving the second body rightward with respect to the first body.

17. The mobile communication terminal of claim 16, wherein the display window of the second body displays an image in a lengthwise direction when the left keypad is uncovered, and displays an image in at least one of a widthwise direction and the lengthwise direction when the left keypad is covered.

18. The mobile communication terminal of claim 16, wherein the guiding assembly is installed on at least one of the front surface of the first body and the rear surface of the second body facing each other, and the side surfaces of the first body and the second body.

* * * * *

UNITED STATES PATENT AND TRADEMARK OFFICE
CERTIFICATE OF CORRECTION

PATENT NO. : 7,636,592 B2 Page 1 of 1
APPLICATION NO. : 11/475122
DATED : December 22, 2009
INVENTOR(S) : Kim et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 761 days.

Signed and Sealed this

Ninth Day of November, 2010

David J. Kappos
*Director of the United States Patent and Trademark Office*